Figure 3:
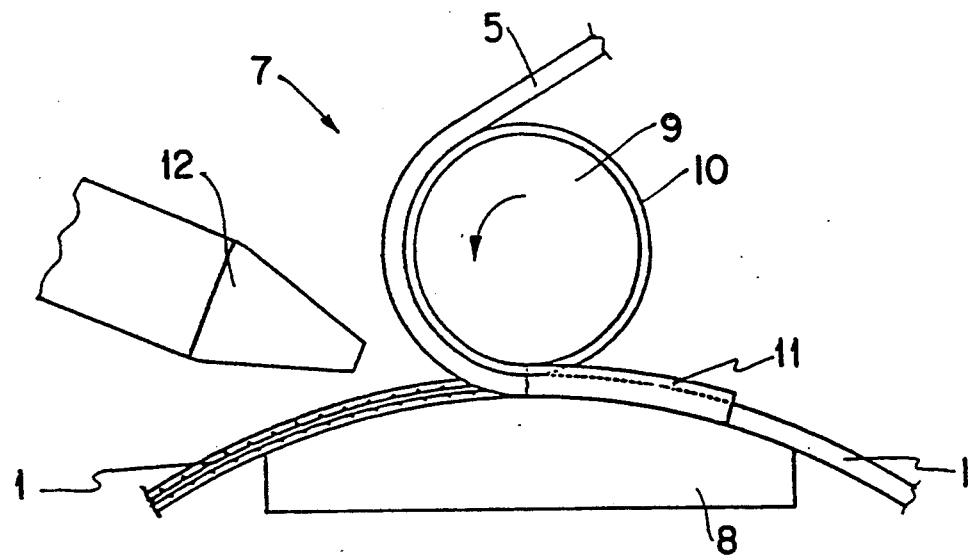

United States Patent [19]

Muraoka et al.

[11] Patent Number: 5,316,132
[45] Date of Patent: May 31, 1994

[54] CONVEYOR BELT AND METHOD FOR ITS MANUFACTURE

[75] Inventors: Tomonori Muraoka, Kakegawa; Isato Atsumi, Ogasa, both of Japan

[73] Assignee: FA. Ernst Siegling, Hanover, Fed. Rep. of Germany

[21] Appl. No.: 881,019

[22] Filed: May 8, 1992

[30] Foreign Application Priority Data

Jun. 29, 1991 [DE] Fed. Rep. of Germany ........ 4121572

[51] Int. Cl.$^5$ .............................................. B65G 15/34
[52] U.S. Cl. ................................................... 198/847
[58] Field of Search ............................ 198/846, 847

[56] References Cited

U.S. PATENT DOCUMENTS

| 4,572,359 | 2/1986 | Fujita et al. ............... 198/847 X |
| 4,667,812 | 5/1987 | Wixey ......................... 198/847 X |

FOREIGN PATENT DOCUMENTS

| 200861 | 11/1958 | Austria . |
| 0839624 | 5/1952 | Fed. Rep. of Germany ...... 198/847 |
| 1670519 | 10/1953 | Fed. Rep. of Germany . |
| 1682637 | 1/1954 | Fed. Rep. of Germany . |
| 1010727 | 6/1957 | Fed. Rep. of Germany . |
| 1002683 | 1/1958 | Fed. Rep. of Germany . |
| 3807814 | 3/1989 | Fed. Rep. of Germany . |
| 1026551 | 10/1950 | France ............................ 198/847 |
| 1273112 | 11/1960 | France ............................ 198/847 |
| 1373653 | 2/1961 | France . |
| 0509503 | 8/1976 | U.S.S.R. ......................... 198/847 |
| 2155359 | 9/1985 | United Kingdom . |

OTHER PUBLICATIONS

Promotional Material of Siegling (Ref. No. 260–Issue 11.90/2).

Schlieper, G., Sales-promoting trick or technical progress, Foerdermittel und Verkettungssysteme, No. 10 (1972), pp. 30, 32.

PFAB, R., Edge protection for conveyor belts, G+A—Plastische Massen, vol. 12 (1959), pp. 380,382.

*Primary Examiner*—James R. Bidwell
*Attorney, Agent, or Firm*—Darby & Darby

[57] ABSTRACT

A conveyor belt is described, which has a support fabric, which is provided with at least one thermoplastic material coating and is characterized in that onto its cutting edges is welded a thermoplastic, strand-like profile material, preferably a round cord so as to constitute an edge protection. Due to the fact that the strand-like profile material (round cord) has a lower melting point than the thermoplastic material of the coating, during welding, substantially no deformation occurs in the coating, even in the vicinity of the contact faces, whereas the profile material having a lower melting point is deformed and adapts to the shape of the cutting edge of the conveyor belt and covers the same. The inventive method makes it possible to economically provide individual endless and finite conveyor belts with an edge protection when this proves necessary.

26 Claims, 2 Drawing Sheets

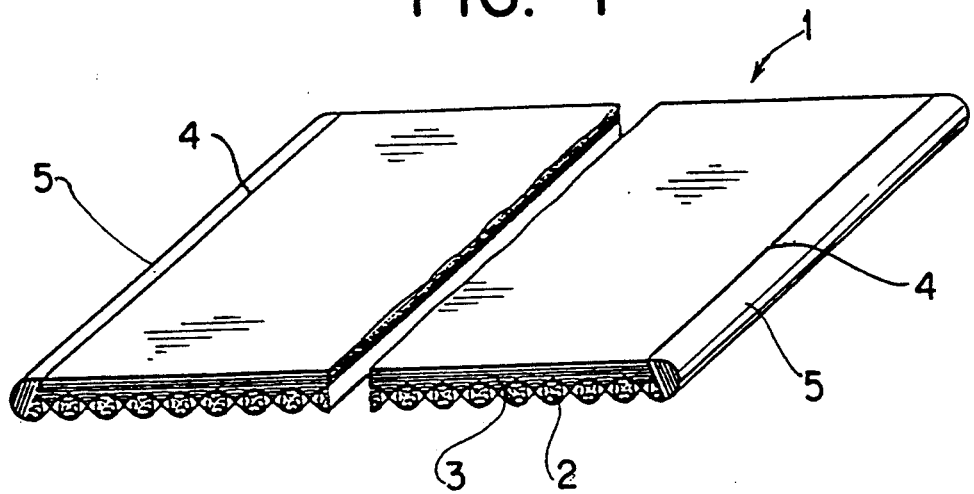
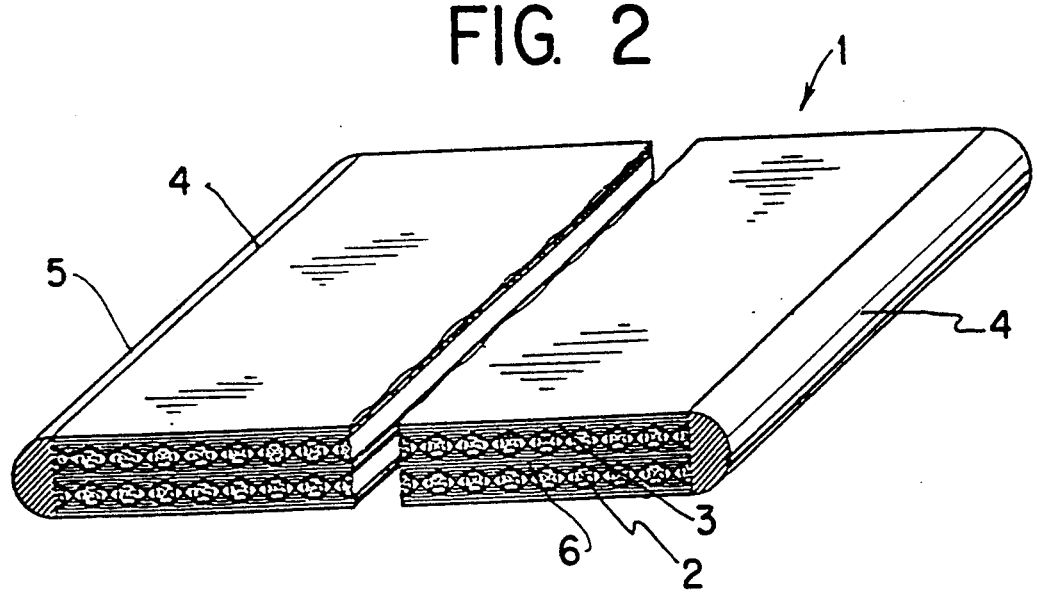

CONVEYOR BELT AND METHOD FOR ITS MANUFACTURE

DESCRIPTION

The invention relates to a conveyor belt with a support or carrier fabric, which is provided with at least one coating of a thermoplastic material. The invention also relates to a method for the manufacture of the conveyor belt.

Conveyor belts of the present type are used in considerable quantities as lightweight conveyor belts for a multiplicity of purposes. By means of the incorporated support fabric it is possible to give the conveyor belts a relatively high longitudinal and transverse stability. Through the provision of two or more support fabric layers, this stability can be further increased.

As a function of the intended use, the support belt can be given a one or two-sided coating of a thermoplastic material. The coating serves to produce the grip appropriate for conveying materials and also produces the necessary resistance to wear. Different materials with different characteristics are used for the coating, such as e.g. PVC or polyurethane.

The known conveyor belts of the aforementioned type suffer from the fundamental disadvantage, that the support fabric is exposed at the belt cutting edges. Thus, when used in the textile industry, the rough cutting edges of such conveyor belts give rise to an in part pronounced fibre adhesion, which causes frequent malfunctions. Due to the wear occurring at the cutting edges additional support fabric can be exposed, which reinforces the above-described effect. The environment can also be polluted by detached fabric particles. Therefore such conveyor belts cannot be used e.g. in clean rooms, where they are frequently required e.g. for the manufacture of electronic components. The use of such conveyor belts has also been significantly hindered, e.g. in the food industry due to the possibility of the deposition of bacteria and foreign bodies on the fabric parts exposed at the cutting edges.

Attempts to seal the cutting edges of said conveyor belts by welding have failed in that it is not possible to displace the support fabric from the surface of the cutting edge of the conveyor belt. The polyester fabric normally used as the support fabric has a much higher melting point than the coatings, so that the latter are melted away or deformed before any premelting or melting away occurs to the support fabric. To the extent that the support fabric is premelted, a rough, non-uniform surface is obtained on which foreign bodies can be deposited to an increased extent.

The problem of the invention is to eliminate these disadvantages and provide an economic possibility of providing conveyor belts at all times with a reliable edge protection.

The invention is based on the finding that, if the thermoplastic, strand-like profile material forming the edge protection has a lower melting point than the thermoplastic material of the coating, it is surprisingly possible to weld the profile material to the cutting edges of the conveyor belt without damaging, i.e. deforming the coating or impairing the surface characteristics thereof.

The material is briefly heated until the coating is merely premelted, whereas the profile material is melted soft. This leads to an intense welding effect and simultaneously to the fact that the coating is not deformed in the vicinity of the cutting edges and retains its material characteristics adapted to the intended use of the conveyor belt. The cutting edge of the conveyor belt is preferably completely covered and a very effective edge protection obtained.

The necessary intense welding, which prevents a separation of the edge protection as a result of mechanical stresses is obtained, because at the contact faces of the cutting edges mixing takes place between the premelted or melted materials and there is generally also a melting down of the materials between the non-premelted fibres of the support fabric in the vicinity of the contact faces.

According to a particularly preferred embodiment of the invention the strand-like profile material is constructed as a round or circular cord. It has been found that the side of the round cord applied to the cutting edge of the conveyor belt adapts very well during welding to the shape of the conveyor belt cutting edge and is connected in full-surface manner to the conveyor belt. It is particularly advantageous if the welded on profile material, e.g. the round cord completely covers in stepfree manner the cutting edge of the conveyor belt with the open edge of the support fabric, so that a smooth, planar belt surface is maintained. The cutting edge is consequently completely sealed with the profile material, which preferably has a smooth surface and the attachment of foreign bodies is prevented in an optimum manner.

The welded on profile material also protects the cutting edges in the case of mechanical stressing, because it is possible to reliably prevent there undesired abrasion or rubbing of fibres or an emergence of carrier fabric fibres. It can also be advantageous to use a profile material with increased resistance to wear.

The round cord according to the invention, which is preferably used as a profile material can be very inexpensively manufactured by using existing tools. This also favours the economic manufacture of smaller quantities, which in each case have a welding behaviour matched to the conveyor belt material. It is also advantageous that a round cord can be supplied very easily to the weld, because rotation can be ignored in the case of round material.

If the round cord has roughly the same diameter as the conveyor belt, the edge protection formed by the welded on round cord can have a diameter identical to the total conveyor belt thickness.

Particularly in the case of conveyor belts with a limited total thickness, it can be advantageous to bevel the cutting edges of the belt prior to the welding on of the round cord, which leads to an increased contact face, which increases the strength of the weld.

According to a preferred embodiment of the invention the conveyor belt support fabric comprises a high strength polyester fabric, which has a melting point higher than that of the material of the coating and the welded on round cord. It has proved advantageous if e.g. the coating of the conveyor belt comprises a thermoplastic material with a melting point of approximately 155° C. and the round cord forming the edge protection comprises a thermoplastic material with a melting point of approximately 145° C.

A particularly intense weld can be achieved if the conveyor belt coating and the round cord forming the cutting edge protection are made from the same thermoplastic materials with different melting points. These can e.g. be polyurethanes with the aforementioned melting points. Obviously these melting points are only given in an exemplified manner. The melting points can be higher or lower or can be further apart or closer together. No problems are encountered in adapting the profile material to the belt material in such a way that a matched welding behaviour is obtained.

The strand-like profile material is applied to the cutting edges of the conveyor belt, in that the cutting edges of the conveyor belt and the strand-like profile material, accompanied by heating to the melting points, are continuously brought together and welded in a welding apparatus, the coating having the higher melting point being heated to such an extent that there is essentially no deformation in the vicinity of the contact faces.

The profile material having the lower melting point is simultaneously heated to such an extent that its side engaging on the conveyor belt cutting edge adapts to the latter during welding and is connected, covering the same, in full-surface manner to the conveyor belt.

This method leads to the further essential advantage that conveyor belts of the aforementioned type in endless or limited form can, if the use conditions make it appear necessary or appropriate, be provided with an effective edge protection. The conveyor belt manufactured by conventional methods is continuously supplied together with the profile material to the welding apparatus and can be very rapidly provided with the edge protection completely independently of its length and width. The cutting edges of the individual conveyor belts can, according to the invention, be provided with the profile material.

The invention is described in greater detail hereinafter relative to non-limitative embodiments and the attached drawings, wherein show:

FIG. 1 a cross-section through a conveyor belt with an edge protection, which comprises a support fabric provided with a coating on one side.

FIG. 2 a cross-section through a conveyor belt with an edge protection comprising two layers of support fabric with coatings between the same and externally on both sides.

FIG. 3 a side view through a welding apparatus for applying the edge protection.

Figure 4:
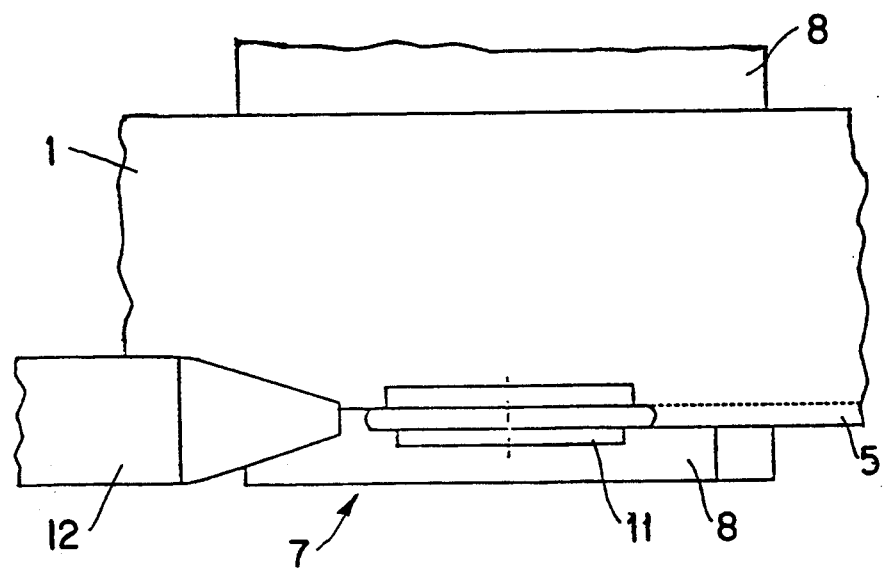

FIG. 4 the welding apparatus according to FIG. 3 in plan view.

In FIG. 1 1 is a conveyor belt, which is provided with a support or carrier fabric 2, which has a one-sided, thermoplastic coating 3. The support fabric 2 is preferably a polyester fabric, but it is also possible to use e.g. a polyamide, cotton or union fabric.

Each of the cutting edges 4 of the conveyor belt 1 is welded to a round or circular cord 5, which is adapted during the welding process to the shape of the cutting edge, i.e. flattened and completely covers said cutting edge 4. The cutting edges 4 are bevelled, so that a larger contact face is provided for welding. Therefore, if necessary, the strength of the weld can be increased.

In the conveyor belt 1 the support fabric 2 ensures an adequate longitudinal and transverse stability. By means of the coating 3 and a corresponding material choice a precise adaptation of the surface of the conveyor belt 1 with respect to its wear resistance and friction coefficient to the material to be conveyed is made possible. In the represented embodiment the support fabric 2 forms the drive side of the conveyor belt 1.

The round cord 5 completely covers in stepfree manner the cutting edges 4 of the conveyor belt 1 with the open edge of the support fabric 2, which gives a smooth surface. Therefore the cutting edges 4 are sealed and the attachment of foreign bodies is ideally prevented due to the smooth surface.

In addition, the welded on round cord 5 provides a good protection in the case of mechanical stressing to the cutting edges 4 because, as stated, an undesired abrasion or emergence of fibres of the support fabric 2 are reliably prevented.

The invention can be used with advantage in the case of all conveyor belts 1 with a support fabric 2 and at least one thermoplastic coating 3 and several layers of support fabric 2 can also be provided. The support fabric 2 can e.g. also be covered by the coating 3 on the top and bottom of the conveyor belt 1.

Such a conveyor belt 1 is shown in FIG. 2. The conveyor belt 1 comprises two layers of support fabric 2 with on both sides outer coatings 3 and an inner coating 6 located between the support fabrics 2.

As this conveyor belt 1 has a greater overall thickness as a result of the provision of two layers of support fabric 2, even in the case of cutting edges 4 at right angles, sufficiently large contact faces are provided for the welding of the round cords 5 forming the edge protection.

As a result of the outer coatings 3 on both sides the conveyor belt 1 is of the type in which the support fabric 2 is completely covered by the coatings 3 and the welded on round cord 5. Thus, no attachments or deposits or any abrasion of fibres can occur on the underside of the belt on the support fabric 2. A conveyor belt 1, whose support fabric 2 is sealed on all sides, can be very universally used in spheres where extreme cleanness requirements exist.

However, in certain circumstances it can be appropriate to provide with the inventive edge protection a conveyor belt 1, which comprises two external layers of support fabric 2 between which there is a thermoplastic coating 6. Here again the covering of the cutting edges 4 can fulfil the function of preventing increased emergence or detachment of fibres as a result of mechanical stressing.

It is obvious that the inventive edge protection can optionally also be produced by welding on, e.g. an angular profile material. However, certain problems are encountered in preventing its twisting or turning tendency, i.e. to orient the profile material during welding precisely with the cutting edge 4 of the conveyor belt 1.

FIGS. 3 and 4 show a welding apparatus 7 for applying the round cord 5 to the cutting edges 4 of the conveyor belt 1. The welding apparatus 7 has a guide table 8 as a support during the continuous supply of the conveyor belt 1.

A pressing roll 9 with an all-round groove 10 is used for the continuous supply and guidance of the round cord 5. There is also a lateral guide 11 for bringing together the conveyor belt 1 and the round cord 5. The lateral guide 11 keeps the two parts reliably contacted during the welding process. The welding apparatus 7 also has a hot air nozzle 12 for producing the necessary welding temperature.

For the application of the edge protection, the conveyor belt 1 is supplied to the welding apparatus 7 in finite or infinite manner in the direction of the arrow. Simultaneously the round cord 5 is supplied in the direction of the arrow from the supply reel not shown in the drawing. By means of the hot air nozzle 12 the supplied material is heated in the aforementioned manner and welding together takes place in the vicinity of the lateral guide 11.

What is claimed is:

1. Conveyor belt with a support fabric, which is provided with at least one thermoplastic coating, characterized in that to cut edges of the conveyor belt is welded a thermoplastic, strand-like profile material as an edge protection, the strand-like profile material having a lower melting point than the thermoplastic material of the coating.

2. Conveyor belt according to claim 1, characterized in that the stand-like profile material is constructed as a round cord.

3. Conveyor belt according to claim 2, characterized in that the round cord has a diameter corresponding to the total thickness of the conveyor belt.

4. Conveyor belt according to claim 3, characterized in that the side of the round cord engaging on the cutting edge of the conveyor belt is adapted during welding to the shape of the cutting edge and covering the same is connected in full-surface manner to the conveyor belt.

5. Conveyor belt according to claim 4, characterized in that, prior to the welding on of the round cord, the cutting edges of the conveyor belt are bevelled in such a way that a larger contact face is obtained.

6. Conveyor belt according to claim 1, characterized in that the support fabric of the conveyor belt is made from a fabric, whose melting point is higher than that of the coating and the welded on round cord.

7. Conveyor belt according to claim 1, characterized in that the support fabric of the conveyor belt is a polyester fabric.

8. Conveyor belt according to claim 1, characterized in that the coating of the conveyor belt comprises a thermoplastic material with a melting point of approximately 155° C. and the welded on round cord a thermoplastic material with a melting point of approximately 145° C.

9. Conveyor belt according to claim 1, characterized in that the coating of the conveyor belt and the round cord consists of the same thermoplastic material with different melting points.

10. Conveyor belt according to claim 1, characterized in that the coating of the conveyor belt and the round cord consist of polyurethanes with a melting point of approximately 155° C. and approximately 145° C.

11. Conveyor belt according to claim 1, characterized in that the round cord has a diameter corresponding to the total thickness of the conveyor belt.

12. Conveyor belt according to claim 1, characterized in that the side of the round cord engaging on the cutting edge of the conveyor belt is adapted during welding to the shape of the cutting edge and covering the same is connected in full-surface manner to the conveyor belt.

13. Conveyor belt according to claim 2, characterized in that the side of the round cord engaging on the cutting edge of the conveyor belt is adapted during welding to the shape of the cutting edge and covering the same is connected in full-surface manner to the conveyor belt.

14. Conveyor belt according to claim 1, characterized in that, prior to the welding on of the round cord, the cutting edges of the conveyor belt are bevelled in such a way that a larger contact face is obtained.

15. Conveyor belt according to claim 2, characterized in that, prior to the welding on of the round cord, the cutting edges of the conveyor belt are bevelled in such a way that a larger contact face is obtained.

16. Conveyor belt according to claim 2, characterized in that the support fabric of the conveyor belt is made from a fabric, whose melting point is higher than that of the coating and the welded on round cord.

17. Conveyor belt according to claim 2, characterized in that the support fabric of the conveyor belt is a polyester fabric.

18. In a conveyor belt, particularly for use in the textile industry and in the food industry as well as for clean-room technology, said belt having two longitudinal edges and being cut at the two longitudinal edges and has a support fabric having fibers, which is provided with at least one coating of a thermoplastic synthetic material, characterized in that a rope-shaped, profiled material is welded as edge protection to the cut edges of the belt, which profiled material has a lower melting point than that of the thermoplastic synthetic material of the coating, which, in the state in which it is beginning to melt, is welded together with said coating which is melted as far as a soft state, so that mixing takes place at the contact surface between the profiled material and the coating and the fibers of the supporting fabric are sealed into the profiled material in the area of the contact surface.

19. The conveyor belt of claim 18, characterized in that the rope-shaped, profiled material is constructed as a round cord.

20. The conveyor belt of claim 19, characterized in that the diameter of the round cord corresponds to the total thickness of the conveyor belt.

21. The conveyor belt of claim 20, characterized in that the side of the round cord, which lies against the cut edge of the conveyor belt, is deformed during sealing and joined to the cut edge over the full area.

22. The conveyor belt of claim 21, characterized in that the cut edges of the conveyor belt are bevelled before the round cord is welded to them, in order to increase the contact area.

23. The conveyor belt of claim 18 characterized in that the melting point of the supporting fabric is higher than the melting point of the coating and of the round cord welded to it.

24. The conveyor belt of claim 18 characterized in that the supporting fabric of the conveyor belt consists of a polyester fabric.

25. The conveyor belt of claim 18 characterized in that the coating of the conveyor belt has a melting point of 155° C. and that the round cord, which is welded to the conveyor belt, has a melting point of 145° C.

26. The conveyor belt of claim 18, characterized in that the coating of the conveyor belt and the round cord consist of the same material, particularly of polyurethane.

* * * * *